United States Patent [19]

Franklin

[11] Patent Number: 4,981,206

[45] Date of Patent: Jan. 1, 1991

[54] PACKAGE HANDLING APPARATUS

[75] Inventor: Kenneth W. Franklin, Leamington Spa, United Kingdom

[73] Assignee: Bishopbarn Limited, Leamington Spa, United Kingdom

[21] Appl. No.: 269,810

[22] Filed: Nov. 9, 1988

[30] Foreign Application Priority Data

Nov. 11, 1987 [GB] United Kingdom ............... 8726404

[51] Int. Cl.$^5$ ................. B65G 47/244; B65G 17/46
[52] U.S. Cl. ................................. 198/409; 198/414; 198/689.1
[58] Field of Search ............... 198/689.1, 409, 414; 271/96, 108, 197, 276, 94

[56] References Cited

U.S. PATENT DOCUMENTS

| | | | |
|---|---|---|---|
| 2,970,708 | 2/1961 | Watanabe et al. | 198/409 |
| 3,476,241 | 11/1969 | Ungerer | 271/197 |
| 3,633,903 | 1/1972 | Foster | 271/197 |
| 3,756,912 | 9/1973 | Rooney | 198/689.1 |
| 3,877,592 | 4/1975 | Krenke et al. | 198/689.1 |
| 4,291,974 | 9/1981 | Silverberg | 198/689.1 |
| 4,457,419 | 7/1984 | Ogami et al. | 198/414 |
| 4,651,984 | 3/1987 | Emrich | 198/689.1 |

FOREIGN PATENT DOCUMENTS 893120 4/1962 United Kingdom .

Primary Examiner—Joseph E. Valenza
Attorney, Agent, or Firm—Shlesinger & Myers

[57] ABSTRACT

Package handling apparatus comprises an enclosure having a downwardly directed opening, a source of air flow arranged to draw air into the enclosure through the opening, and lowers for varying the air flow into the enclosure. A conveyor is arranged in the opening and is movable relative to the opening, the conveyor being positioned to be in the flow of air into the enclosure and to provide a movable support for a package which is urged against the conveyor by the flow of air past the support.

10 Claims, 2 Drawing Sheets

PACKAGE HANDLING APPARATUS

FIELD OF THE INVENTION

The present invention relates to package handling apparatus for conveying products such as packets of snack foods.

DESCRIPTION OF PRIOR ART

In package handling apparatus such as in installations for conveying packages from one location to another, possibly with a change of orientation, it is well known to employ suction heads against which the packages are drawn. Conventional suction heads require a relatively high vacuum which is normally supplied from continuously running suction pumps. In order to provide sufficient suction for most of the heads when one or perhaps two other heads are not closed off by a package, the pump requires sufficient capacity to generate an appropriate level of suction with such unrestricted flow through a small number of heads. An inevitable result is a requirement for a large capacity suction pump which is expensive to install and operate, runs noisily and generates unrequired heat. In a factory environment, the noise and heat make for undesirable working conditions.

OBJECT OF THE INVENTION

An object of the present invention is to provide a package handling apparatus and method in which these disadvantages can be reduced or overcome.

SUMMARY OF THE INVENTION

According to one aspect of the present invention there is provided a package handling apparatus which comprises:

an enclosure having a downwardly directed opening;

a source of air flow arranged to draw air into the enclosure through the opening;

means for varying the air flow into the enclosure; and support means arranged in the opening and movable relative to the opening, the support means being positioned to be in the flow of air into the enclosure and to provide a movable support for a package which is urged against the support means by the flow of air past the support.

Preferably, the source of air flow comprises a centrifugal fan. The fan and a driving motor for the fan may be mounted directly on the enclosure. Preferably the means for controlling air flow comprises a valve constituted by one or more louvres.

The support means may comprise a conveyor positioned in said opening and operable to transport packages from one location to another. Additionally or alternatively, the support means may comprise a platen which is rotatable within the opening for changing the orientation of a package in the opening.

The apparatus may include at least two sources of air flow each provided with separate means for varying the air flow. The apparatus may include a divider within the enclosure so as to divide the enclosure into sections each provided with a source of air flow and means for varying the air flow so as to enable a package to be handled independently in each of the sections.

The package handling apparatus according to the present invention permits a package to be handled, for example transported and/or rotated, in a large volume of relatively fast moving air and with a small pressure drop. We have found that the heat and noise generated by the apparatus and method of the present invention is substantially less than with the prior art thus improving the working environment in addition to permitting savings in energy.

For a better understanding of the present invention and to show more clearly how it may be carried into effect reference will now be made, by way of example, to the accompanying drawings in which:

The package handling apparatus is intended primarily for lifting and transporting packages such as packets of potato crisps from one location to another. However, the apparatus may be used for conveying other products such as other packets of snack foods. The apparatus is particularly appropriate for conveying high-bulk lightweight products but can also be used with heavier products having sufficient surface area.

Figure 1:
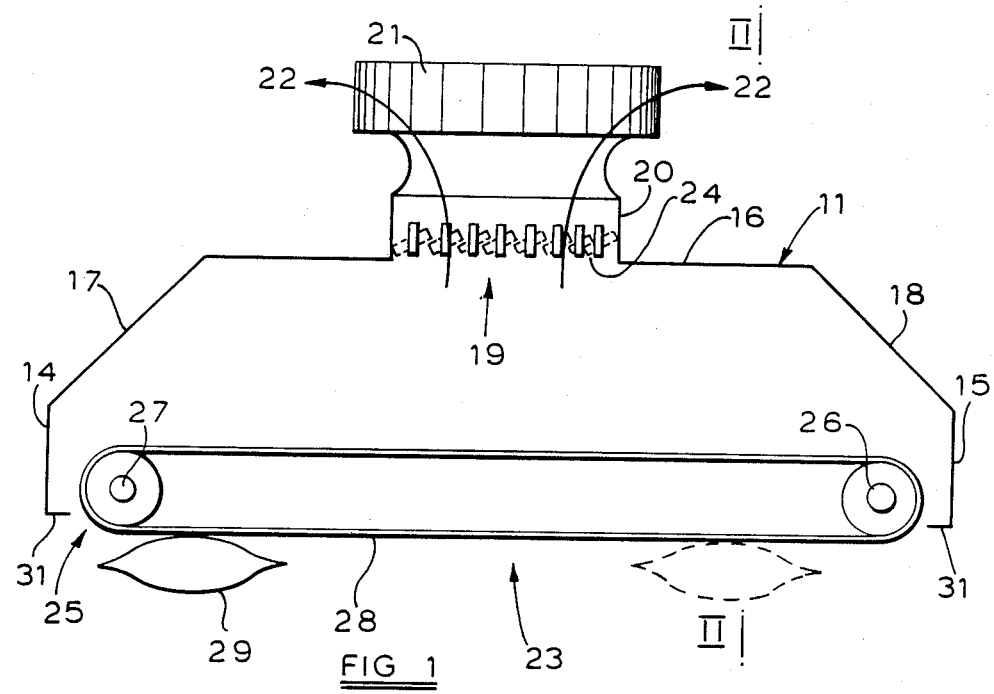
FIG. 1 is a diagrammatic cross-sectional view of one embodiment of a package handling apparatus according to the present invention.
Figure 2:
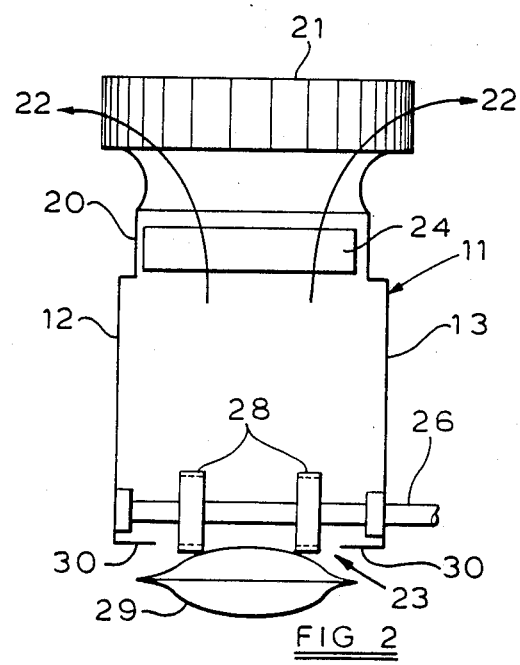
FIG. 2 is a diagrammatic cross-sectional view along the line II—II shown in FIG. 1.

The package handling apparatus shown in FIGS. 1 and 2 comprises an enclosure in the form of an elongate hood 11 made from sheet metal and comprising side walls 12,13, end walls 14,15, an upper wall 16, and inclined end walls 17,18. A generally circular opening 19 is formed in the upper wall 16 and mounted on the upper wall 16 and in communication with the opening 19 by way of a circular wall 20 is a centrifugal fan 21 which is driven by an integral electric motor. The fan 21 is arranged to draw air out through the opening 19 in the hood as indicated by arrows 22 and thus acts as a source of air flow arranged to draw air into the hood by way of an opening 23 defined by the side walls 12,13 and the end walls 14,15. An arrangement of louvres 24 provided within the circular wall 20 is shown in an open position in solid lines and in a closed position in dashed lines in FIG. 1. The louvres 24 form a valve which acts as a means for controlling or varying air flow through the hood 11.

Mounted in the opening 23 is a conveyor 25 which comprises a driven shaft 26 having a pair of driven rollers mounted thereon and an idle shaft 27 having a pair of idle rollers mounted thereon. A pair of belts 28 of high friction material extend around the idle rollers and the driven rollers and are movable to transport packages 29 on rotation of the driven shaft 26. The dimensions of the opening 23 are determined by a pair of side plates 30 and by a pair of end plates 31.

In use, a package such as a packet of potato crisps is conveyed to a position below one end of the conveyor 25. The fan 21 runs continuously but at this stage the louvres 24 are closed and no air is drawn into the hood 11.

Once the package is in position the louvres are opened and air flows upwardly into the hood. Despite a pressure drop of only about 0.01 bar, the upward movement of air draws the package upwardly against the conveyor 25 which then transports the package to a second location at the other end of the conveyor. The louvres 24 are then closed and this allows the package to drop away from the conveyor to a desired position.

Figure 3:
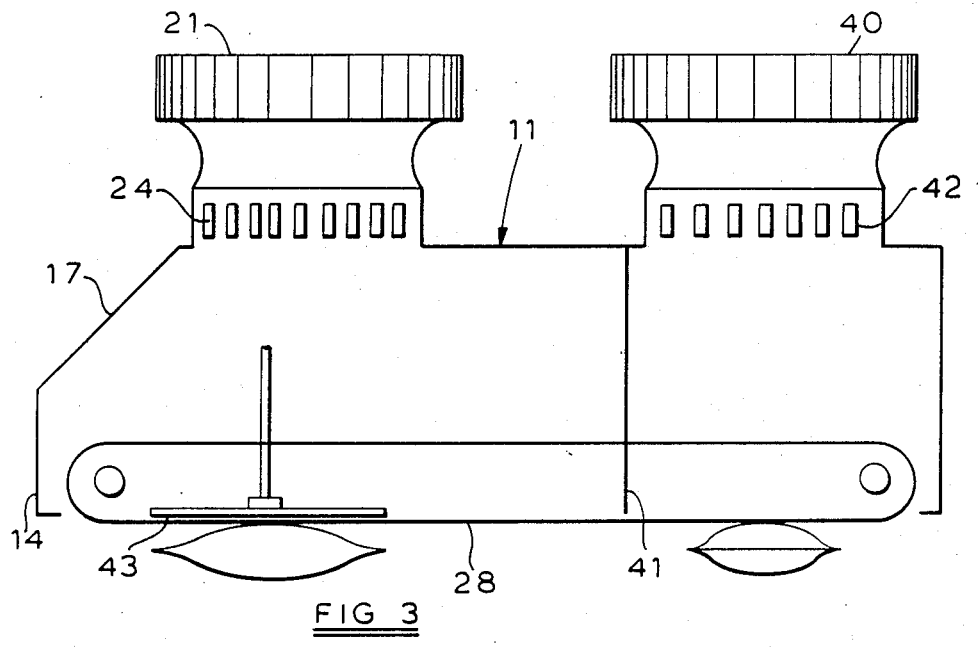
FIG. 3 is a diagrammatic cross-sectional view of a second embodiment of a package handling apparatus according to the present invention.
Figure 4:
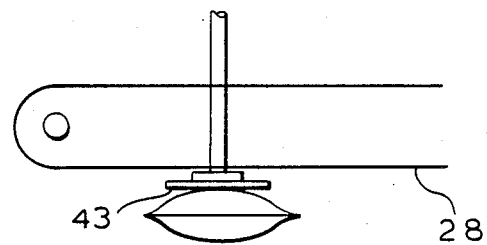
FIG. 4 shows a part of the apparatus of FIG. 3 with a turning platen lowered.

The embodiment of the package handling apparatus shown in FIGS. 3 and 4 operates on the same principle as that shown in FIGS. 1 and 2 and the same reference numerals are used to indicate the same or similar parts.

The package handling apparatus shown in FIGS. 3 and 4 incorporates a second centrifugal fan 40 and a dividing plate 41 is provided in the hood 11 so that fan 21 and louvres 24 control or vary the flow of air into the left-hand side of the hood as shown in FIG. 3 while the fan 40 and louvres 42 control or vary the flow of air into the right-hand side of the hood as shown in FIG. 3. This enables the packages to be controlled independently on different sections of the conveyor.

In addition, the package handling apparatus shown in FIGS. 3 and 4 incorporates a turning platen 43 which extends between the belts 28 of the conveyor 25 and which is movable between a raised position (FIG. 3) in which it does not bear against the packages and a lower position (FIG. 4) in which it is able to support a package in the air flow into the hood 11. The turning platen 43 is rotatable and permits the orientation of a package to be changed. This can be accomplished, for example, by lowering the turning platen, turning it through 90°, opening the louvres 24 to create an air flow and to urge a package against the underside of the platen, rotating the platen back through 90°, and raising the platen such that the package rises and engages against the conveyor. When the package reaches the other end of the conveyor it can then be transported in a direction at right angles to its incoming direction of can be processed further in its new orientation as required.

I claim:

1. Apparatus for handling a package having lateral sides, comprising:
   (a) an enclosure having a downwardly directed opening and an outlet, said opening having a longitudinal axis;
   (b) said opening having substantially apart and opposed first and second ends along said longitudinal axis;
   (c) support means disposed across said opening and movable between said opening first and second ends along said longitudinal axis for engaging and transporting the package between said opening first and second ends;
   (d) air flow means for causing a large volume of air to flow upwardly and relatively fast into said opening past said support means and out of said outlet with a small pressure drop;
   (e) said support means being substantially disposed in said opening between said first and second ends and across the air flow; and
   (f) said support means including a pair of narrow conveyors spaced apart from each other and being substantially non-obstructive to the airflow for permitting the large volume of air to flow from underneath and around the lateral sides of the package for urging the package upwardly against said conveyors, thereby permitting said conveyors to transport the package in the direction of said longitudinal axis from one of said first and second ends to the other end.

2. Package handling apparatus in claim 1, wherein:
   (a) said air flow means includes a fan mounted across said outlet for drawing air through said opening.

3. Package handling apparatus as in claim 2, wherein:
   (a) said fan is a centrifugal fan.

4. Package handling apparatus as in claim 2, wherein:
   (a) said fan is mounted on said enclosure.

5. Package handling apparatus as in claim 1, and further comprising:
   (a) means for varying the air flow into said enclosure.

6. Package handling apparatus as in claim 5, wherein:
   (a) said varying means includes a louver operable between closed and open positions.

7. Package handling apparatus as in claim 6, wherein:
   (a) said louver is disposed across said outlet.

8. Package handling apparatus as in claim 1, wherein:
   (a) said conveyors include a pair of continuous belts spaced apart from each other.

9. Package handling apparatus as in claim 8, wherein:
   (a) said support means includes a rotatable platen disposed between each of said belts for engaging and changing the orientation of the package.

10. Package handling apparatus as in claim 1, wherein:
    (a) said support means includes a rotatable platen disposed in said opening for engaging and changing the orientation of the package.

* * * * *